March 15, 1966     S. SMITH     3,240,301
FRICTION CLUTCH BRAKE MECHANISM
Filed July 2, 1963     4 Sheets-Sheet 1
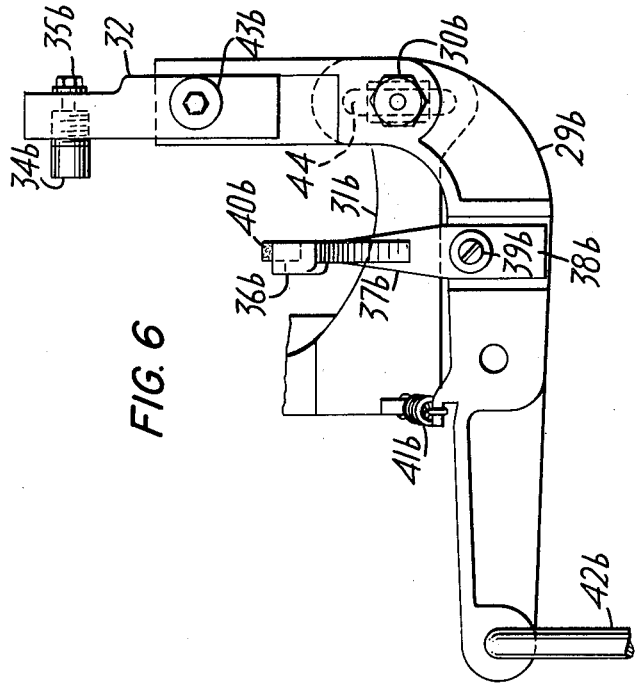
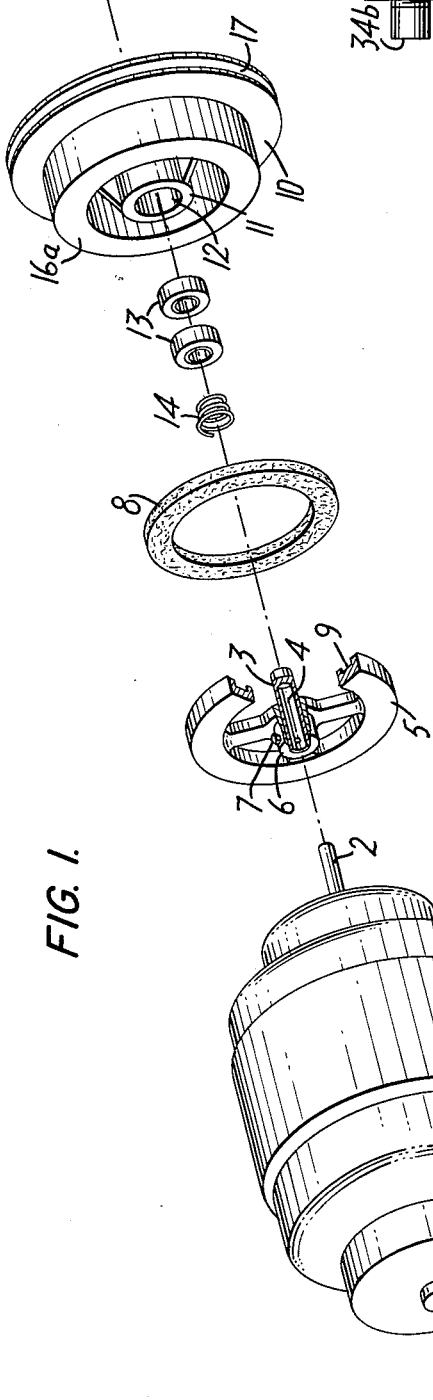
*INVENTOR.*
SAMUEL SMITH
BY Arthur O. Klein
*ATTORNEY*

March 15, 1966  S. SMITH  3,240,301
FRICTION CLUTCH BRAKE MECHANISM
Filed July 2, 1963  4 Sheets-Sheet 2

INVENTOR.
SAMUEL SMITH
BY Arthur O. Klein
ATTORNEY

March 15, 1966     S. SMITH     3,240,301
FRICTION CLUTCH BRAKE MECHANISM
Filed July 2, 1963     4 Sheets-Sheet 3
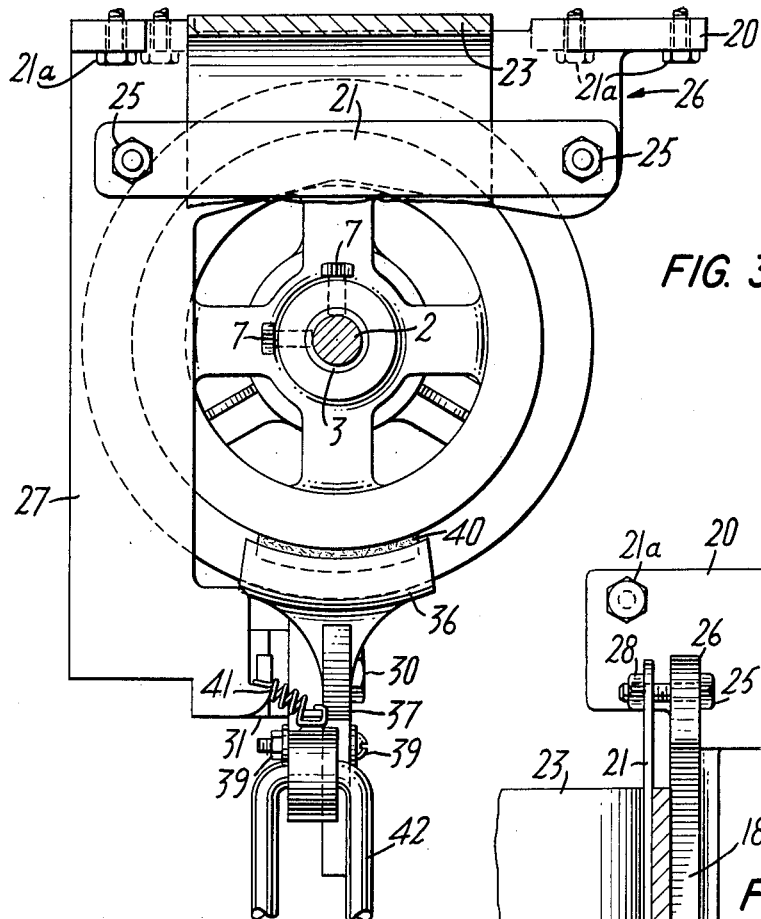
FIG. 3
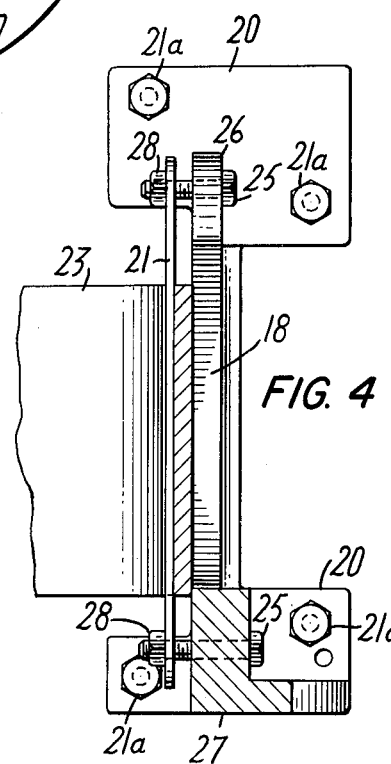
FIG. 4
FIG. 5
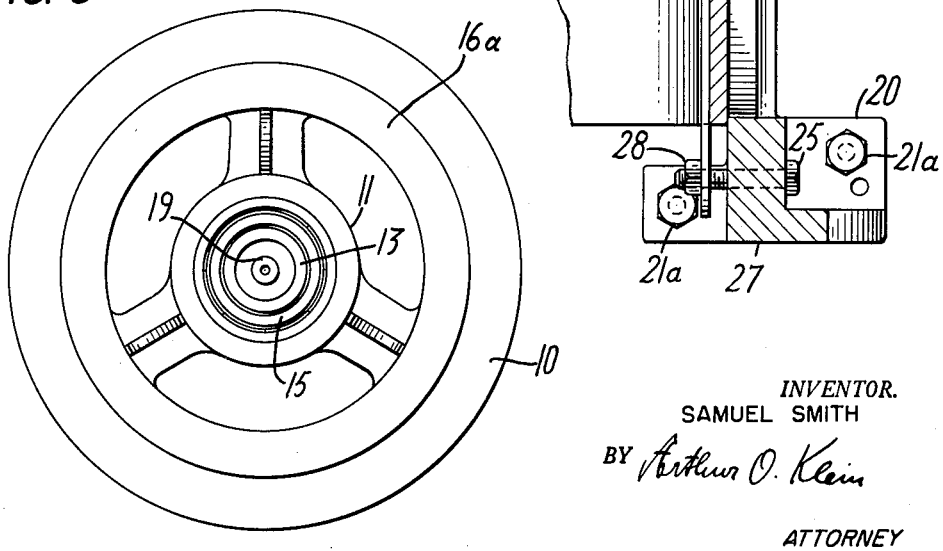
INVENTOR.
SAMUEL SMITH
BY Arthur O. Klein
ATTORNEY March 15, 1966  S. SMITH  3,240,301
FRICTION CLUTCH BRAKE MECHANISM
Filed July 2, 1963  4 Sheets-Sheet 4
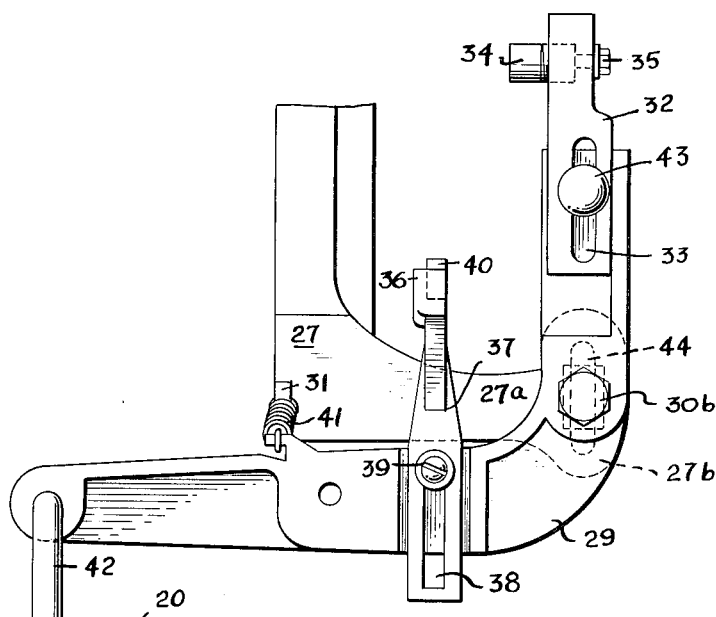
FIG. 7
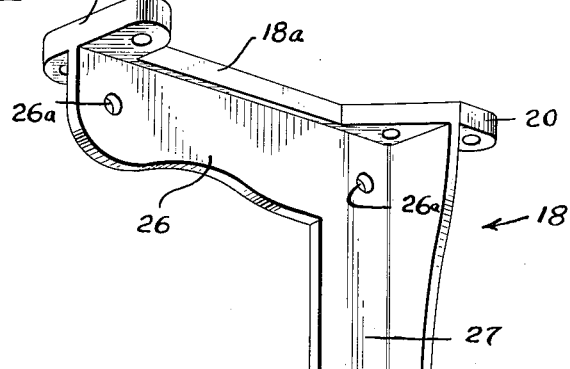
FIG. 8
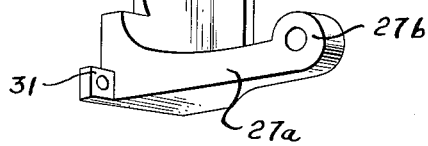
INVENTOR.
SAMUEL SMITH United States Patent Office 3,240,301
Patented Mar. 15, 1966

3,240,301
FRICTION CLUTCH BRAKE MECHANISM
Samuel Smith, Flushing, N.Y.
(220 W. 38th St., New York 18, N.Y.)
Filed July 2, 1963, Ser. No. 295,867
1 Claim. (Cl. 192—17)

This invention relates to a novel power transmission device and is more particularly related to a friction clutch assembly adapted to be used with small horsepower motors of the type used in conjunction with sewing machines.

This application is a continuation-in-part of my copending application Serial No. 64,595, filed October 24, 1960, and now abandoned.

One of the most common difficulties encountered with this type of clutch assembly is to secure and maintain the alignment of the driven belt pulley and the shaft of the small horsepower motor. Faulty alignment of these two parts reduces the power output of the device and also causes excessive wear of the driving members of the clutch assembly and the eventual malfunction of the entire device.

To overcome this difficulty, small horsepower motors used in connection with sewing machines are usually provided with a special heavy casing which supports the motor and clutch. These interfitting parts must, however, be accurately machined in order for the motor shaft and clutch to fit together in alignment. This is relatively expensive and has proven to only ameliorate, but not to remedy, the aforesaid difficulties.

This invention proposes a certain arrangement and construction wherein the heavy casing is completely eliminated and wherein the drive shaft of the motor supports the friction disc as well as the belt pulley of the clutch and thereby results in a completely self-aligning clutch assembly.

Accordingly, it is a general object of this invention to provide a completely self-aligning clutch assembly wherein the possibility of misalignment of the driving and driven parts of the clutch assembly is completely obviated.

Another object of my invention is to provide for positional adjustment of the clutch assembly so that it may be used in conjunction with different size and make small horsepower motors.

Another object of my invention is to provide a clutch assembly of simplified construction with a view of reducing the cost of manufacture, improving the efficiency of and prolonging the useful mechanical life of the device and facilitating the assembly and disassembly thereof.

The novel features, which are considered as characteristic of the invention, are set forth in particular in the appended claim. The invention itself, however, both as to its construction and its method of operation, together with additional objects and advantages thereof, will be best understood from the following description when read in connection with the accompanying drawings in which:

FIG. 1 is an exploded perspective view of the motor and clutch assembly, with portions thereof cut away;

FIG. 3 is a sectional elevation along line 3—3 of FIG. 2;

FIG. 4 is a sectional plan along line 4—4 of FIG. 2;

FIG. 5 is a plan view of the belt pulley and bearings secured in said belt pulley;

FIG. 6 is another embodiment of the stop lever assembly forming part of my invention.

FIG. 7 is a view similar to FIG. 6 of another modified embodiment of my invention; and FIG. 8 is a perspective view of the lever supporting bracket.

Figure 2:
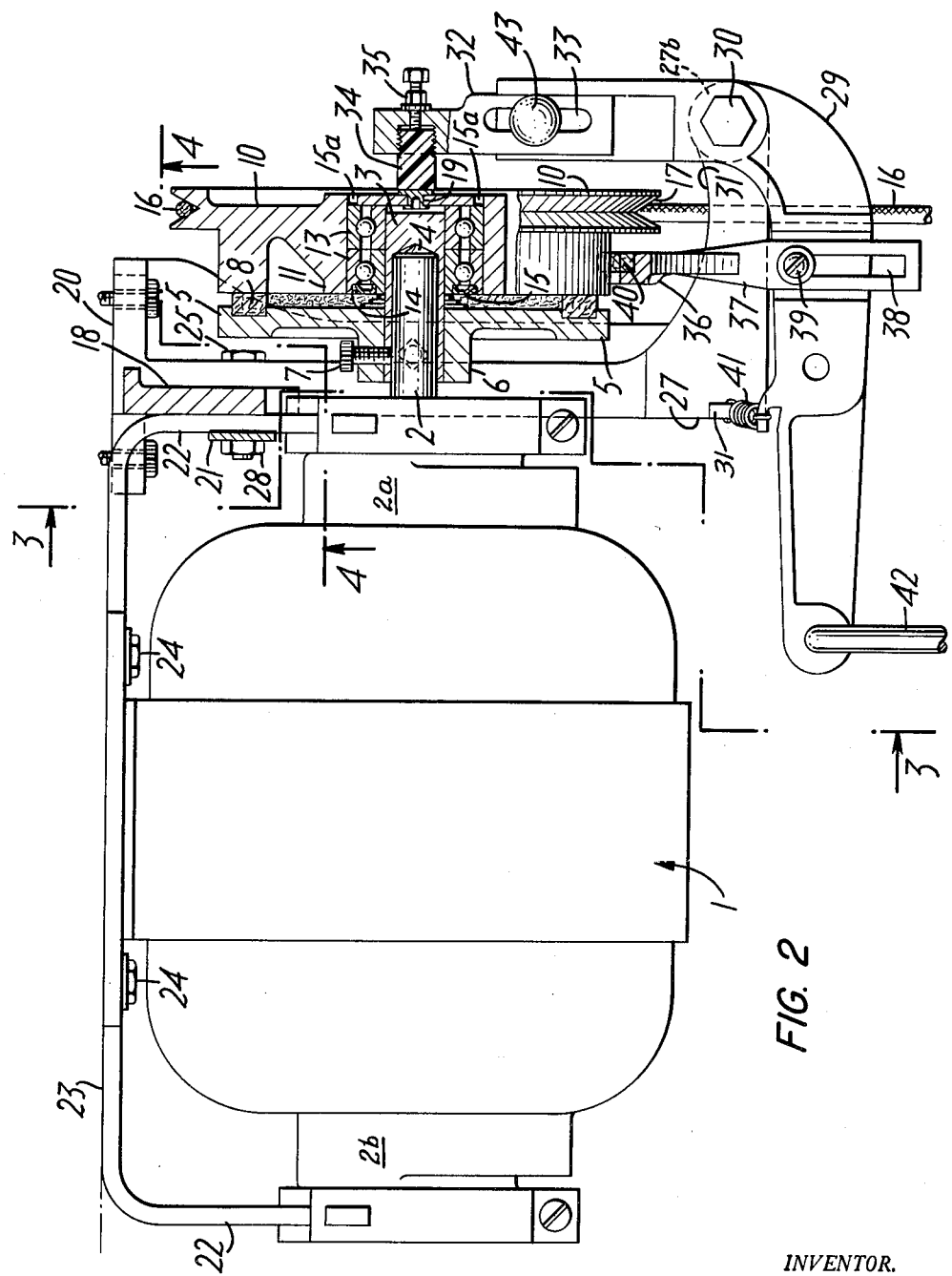
FIG. 2 is a side elevation, partially in section, of the entire device.

Referring now specifically to the drawings in which like numerals represent similar parts, the clutch assembly forming part of my invention is used in conjunction with a conventional small horsepower motor 1, having a driven shaft 2 axially projecting through one typical end bonnet 2a thereof. A sleeve 3, preferably of hardened steel, having an axial bore 4, slidably fits over the shaft 2 of the motor 1. A fraction wheel 5, having a hub portion 6 is tightly fitted over said sleeve 3 and secured thereto and to the motor shaft 2 with a plurality of radial screws 7. An annular friction band 8 is tightly pressed into an annular recess 9 formed in one side face of the friction wheel 5 and is secured therein with rubber cement or the like. The friction band 8 may consist of any suitable material having a high coefficient of friction, but is preferably made of rubberized cord, cork or leather. A belt pulley 10, preferably of aluminum, having a hub portion 11 with an axial bore 12, is rotatably supported on an extended portion of the sleeve 3 by means of two ball bearings 13. A spring 14, slidably supported on the extended portion of sleeve 3, axially abuts against the friction wheel 5 at one end thereof and against the ball bearing 13 at the other end thereof. The ball bearings 13 are securely frictionally held in place inside the bore 12 of the hub 11. It is possible to obtain a tight fit between the outer race of the bearings 13 and interal wall of the bore 12 in several ways. For instance, the pulley 10 may be heated, the bearings 13 can then be easily inserted in the bore 12 and the pulley is then cooled again to its ambient temperature. In the embodiment shown, an annular clip 15 (FIGS. 2 and 5) frictionally holds the two ball bearings inside the bore 12 of the hub 11 and assures their retention therein. The inner race of the bearings 13 is slidably and rotatably supported on the sleeve 3. The ball bearings 13 may be removed from the hub 11 by applying a special tool (not shown and not forming part of this invention) through knock-out holes 15a at the end wall of belt pulley 10. A take-off belt 16 fits into the annular groove 17 of the pulley and runs from the latter up to a pulley on the main shaft of sewing machine or the like (not shown) in the usual manner. The driven pulley 10 is preferably constructed of aluminum, or other light metal, so as to have small momentum; the friction wheel 5, on the other hand, is preferably constructed of cast iron or steel so that it may act like a fly-wheel. From the construction thus far described it can be noted that both the friction wheel 5 and the pulley 10 are supported on motor shaft 2 by the agency of the sleeve 3. In this manner, the alignment of the friction wheel 5 and pulley 10 is permanently assured without requiring any manual adjustment.

The pulley 10 is rotated by causing it to move axially toward the friction wheel 5 so that the face portion 16a of the pulley 10 frictionally abuts against the friction band 8. This axial movement of the pulley 10 is effectuated by actuating a lever assembly that acts against the bias of spring 14.

The aforementioned lever assembly consists, in part, of a lever supporting bracket, FIG. 8, generally designated at 18, which is formed by an elongated narrow plate section 18a defined between enlarged end flanges 20. A flanged leg element 26 is formed perpendicularly to and longitudinally of said plate section 18a and is provided with bolt holes 26a adjacent each end thereof. A second elongated leg element 27 is formed as a perpendicular extension from one end of leg element 26. The projected end of the second leg element 27 is provided with a perpendicularly extending foot 27a which lies in a plane perpendicular to the longitudinal centerline of plate section 18a. The extreme end of the foot 27a is provided with an enlarged transversely drilled boss 27b to which the lever 29, to be hereinafter described, is pivotally connected.

Each of the two flange portions 20 has two holes, each hole being adapted to accommodate a screw or bolt 21a by means of which the entire lever assembly may be secured to the underside of a table top or the like (not shown). The conventional small horsepower motor is constructed with a base 23 having vertical legs 22 which engage and support the motor end bonnets 2a and 2b. The base 23 has a plurality of holes, each hole being adapted to accommodate a screw or bolt 24 by means of which the motor 1 and base 23 may be secured to the underside of a table top or the like (not shown).

In the present embodiment the lever assembly is adjustably secured to the motor base 23 by means of a bracket 21 and two bolts 25. The bracket 21 is slipped behind the frontal vertical leg 22, the bolts 25 are then inserted through holes 26a in the vertical legs 26 and through the holes at the outer ends of bracket 21 and are tightened with nuts 28. The friction developed between the brackets 21 and 28, on the one hand, and the vertical leg 22 of the base 23, on the other hand, due to the tightening of bolts 25 and nuts 28, assures a firm connection between the motor base 23 and the entire lever assembly. The lever assembly may thus be vertically or horizontally adjusted with respect to the motor base 23 by positioning it before tightening the bolts 25 and nuts 28.

A bell crank lever 29 is pivoted with a bolt 30 to the boss 27b of the leg element 27 of bracket 18. A shift arm 32 is vertically adjustably secured to the lever 29. The shift arm 32 has a vertical slot 33. A bolt and nut 43 extending through the vertical slot 33 of the shift arm 32 and through corresponding holes in the vertical end of lever 29 serves to vertically adjustably secure the shift arm 32 to the lever 29. A plastic pressure knob 34 is threaded into the shift arm 32 and is adjustably secured therein by means of a bolt and nut 35. A brake shoe 36 having a stem 37 is vertically adjustably secured to the lever 29. The stem 37 has a vertical slot 38. A bolt and nut 39 extending through the vertical slot 38 of the stem 37 and through a corresponding hole of the lever 29 serves to vertically adjustably secure the brake shoe 36 to the lever 29. The usual brake facing 40 is secured to brake shoe 36 with glue or the like.

It should be noted that this novel lever assembly forming part of my invention can be adapted to all types and makes of small horsepower motors even though the distance between motor shaft and motor base may vary. This may be accomplished in the following manner: the lever assembly is positioned so that the pressure knob 34 is properly aligned with the motor shaft 2 and is then secured to the motor base vertical leg 22 by the agency of bracket 21, bolts 25 and nuts 28. The brake shoe 36 is then placed in an operative position with respect to the pulley 10 and secured to the lever 29 by means of bolt and nut 39. A finer adjustment of shift arm 32 can then be made by means of bolt and nut 43.

Lock washers or lock nuts or other suitable means can be provided in order to lock the adjusted parts in their adjusted positions.

A spring 41 connected to a tab 31 on the extended end of leg 27 and the lever 29 normally pulls the lever 29 away from the pulley 10 by pivoting the latter about bolt 30. A link 42 extends to a pedal (not shown) by which the lever 29 can be operated.

Upon pivoting the lever 29 about bolt 30, the pressure knob 34 is thrust against a mating knob 19, preferably of hardened steel, centrally secured in the back wall of pulley 10 opposite the pressure knob 34. Simultaneously therewith, the brake shoe 36 is lifted out of contact with the pulley 10 and the face portion 16a of the pulley 10 is pressed against the friction band 8 of the rotating friction wheel 5, which is actuated by the motor 1. Upon releasing the pull on lever 29, the spring 41 restores the pressure knob 34 to its inactive position; simultaneously therewith, the brake shoe 36 is again abutting against the pulley 10 and thereby stops the rotary movement thereof, and the spring 14 urges the pulley 10 out of contact with the friction band 8.

It is to be understood that the invention is not limited to the construction of the above-described lever assembly. The distance between the center of pulley 10 and the annular mating contacting surface thereof that cooperates with the brake facing 40 would be the same for pulleys of different diameters. It would, therefore, be adequate to adjust vertically the lever 29 at its pivot support or make the vertical leg 27 of bracket 18 itself vertically adjustable. The aforedescribed features, taken singly or in combination, are also intended to be within the scope of this invention.

In FIG. 6, for instance, there is disclosed a modified embodiment of the lever assembly 29. The suffix b accompanies therein the various numerals that describe the parts similar to those illustrated in FIGS. 1–5. The pivot bolt 30b extends through a vertical slot 44 formed in boss 27b on vertical leg 27 of bracket 18. In this manner, the lever 29b may be vertically adjusted by fastening the pivot bolt 30b in the vertical slot 44, thus adjusting the brake and pressure knob simultaneously.

The modified form shown in FIG. 7 incorporates all of the adjustable features of the two forms shown in FIGS. 2 and 6, respectively. In this form shift arm 32 is secured to lever 29 by means of bolt 43 engaging in slot 33 (FIG. 2); lever 29 is secured to the lever bracket by bolt 30b engaging in slot 44 (FIG. 6); and brake shoe stem 37 is secured to lever 29 by bolt 39 engaging in slot 38 (FIG. 2).

Although the present invention has been described in conjunction with preferred embodiments, it is to be understood that modifications and variations may be resorted to without departing from the spirit and scope of this invention, as those skilled in the art will readily understand. Such modifications and variations are considered to be within the purview and scope of the invention and appended claim.

What I claim is:

In combination with an electric motor having end bonnets, a driven shaft projecting from one of said bonnets, and a supporting bracket engaging the end bonnets of said motor; a friction brake mechanism comprising, a sleeve fixed on the driven shaft of said motor, a wheel fixed on said sleeve, a friction band on that face of the wheel remote to said motor, a pulley slidable on said sleeve into and out of engagement with said friction band, a compressible spring rotatably mounted on said sleeve and interposed between and engaging said wheel and said pulley normally biasing them apart, a lever bracket fixed on the motor supporting bracket adjacent that end bonnet of said motor from which the driven shaft projects, said lever bracket presenting an end radially spaced from the axis of the driven shaft, a bell-crank lever secured to said lever bracket by a slot and bolt assembly permitting relative adjustment thereof and pivotal movement of said bell-crank relative to said slot and bolt assembly, a pressure knob secured to that end of said bell-crank lever adjacent the axis of said pulley and adjustable relative to said lever radially of the axis of said pulley by a slot and bolt assembly interconnecting said knob and said bell-crank lever, a brake band supported by a slot and bolt assembly adjacent the second end of said bell-crank lever and adjacent the periphery of said pulley permitting adjustment of said brake band toward and away from the periphery of said pulley and radially of the axis of said motor shaft, resilient means coupling said lever and lever bracket biasing said lever to position said pressure knob out of engagement with said pulley, and actuator means engaging the second end of said lever operable against the bias of said resilient means to effect movement of said pressure knob into engagement with said pulley and simultaneous converse movement of said brake band relative to the periphery of said pulley.

References Cited by the Examiner

UNITED STATES PATENTS

| | | | |
|---|---|---|---|
| 782,481 | 2/1905 | Borton | 192—17 |
| 1,260,296 | 3/1918 | Axilrod | 192—17 |
| 1,775,724 | 9/1930 | Katzman | 192—17 |
| 1,847,645 | 3/1932 | Friedman | 192—17 XR |
| 2,167,450 | 7/1939 | Ginsburg | 192—17 XR |
| 2,179,360 | 11/1939 | Vasta | 192—17 XR |
| 2,489,584 | 11/1949 | Miller | 192—17 XR |
| 2,493,894 | 1/1950 | Minkowitz | 192—17 XR |

DON A. WAITE, *Primary Examiner.*

DAVID J. WILLIAMOWSKY, *Examiner.*